(12) United States Patent
Kim et al.

(10) Patent No.: US 12,325,946 B2
(45) Date of Patent: Jun. 10, 2025

(54) WASHING MACHINE

(71) Applicant: SAMSUNG ELECTRONICS CO., LTD., Suwon-si (KR)

(72) Inventors: Yeonje Kim, Suwon-si (KR); Dongbum Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 18/081,369

(22) Filed: Dec. 14, 2022

(65) Prior Publication Data
US 2023/0257923 A1    Aug. 17, 2023

Related U.S. Application Data

(63) Continuation of application No. PCT/KR2022/018102, filed on Nov. 16, 2022.

(30) Foreign Application Priority Data

Feb. 16, 2022   (KR) .................. 10-2022-0020390

(51) Int. Cl.
  *D06F 37/30*   (2020.01)
  *F16H 57/04*   (2010.01)
  *D06F 23/02*   (2006.01)

(52) U.S. Cl.
  CPC .......... *D06F 37/30* (2013.01); *F16H 57/0416* (2013.01); *D06F 23/02* (2013.01)

(58) Field of Classification Search
  CPC ........................ D06F 37/30; F16H 57/0416
  See application file for complete search history.

(56) References Cited

U.S. PATENT DOCUMENTS

| 4,531,928 A | 7/1985 | Ikenoya |
| 5,187,954 A | 2/1993 | Kim et al. |
| (Continued) | | |

FOREIGN PATENT DOCUMENTS

| CN | 107083644 A | * | 8/2017 | ............. D06F 37/30 |
| CN | 114672957 A | * | 6/2022 | ............. D06F 37/06 |
| (Continued) | | | | |

OTHER PUBLICATIONS

Machine translation of CN-114672957-A, dated Jun. 28, 2022. (Year: 2022).*

(Continued)

*Primary Examiner* — Michael E Barr
*Assistant Examiner* — Kevin G Lee
(74) *Attorney, Agent, or Firm* — STAAS & HALSEY LLP

(57) ABSTRACT

A washing machine includes a main body, a tub inside the main body, a drum configured to be rotated inside the tub, and a drive device configured to rotationally drive the drum. The drive device includes a drum shaft connected to the drum, a motor including a stator and a rotor configured to be rotated by an interaction with the stator, a sun gear connected to the rotor, a carrier connected to the drum shaft, a planetary gear configured to transmit a rotational force of the sun gear to the carrier, and a cooling flow path formed therein and through which air is introduced and discharged to cool the planetary gear. The cooling flow path includes a first cooling hole formed in the sun gear to allow outside air to be introduced, and a second cooling hole formed in the rotor to allow inside air to be discharged.

18 Claims, 14 Drawing Sheets

(56) References Cited

U.S. PATENT DOCUMENTS

| | | |
|---|---|---|
| 8,816,542 B2 | 8/2014 | Kim |
| 10,053,812 B2 | 8/2018 | Kim et al. |
| 10,851,873 B2 | 12/2020 | Yoo et al. |
| 2007/0132323 A1 | 6/2007 | Park |
| 2007/0205682 A1 | 9/2007 | Choi et al. |
| 2009/0021089 A1 | 1/2009 | Nashiki |
| 2010/0156216 A1 | 6/2010 | Lee et al. |
| 2010/0156231 A1 | 6/2010 | Lee et al. |
| 2012/0043833 A1 | 2/2012 | Lee |
| 2013/0164099 A1 | 6/2013 | Rosemann et al. |
| 2017/0167511 A1 | 6/2017 | Tsuji et al. |
| 2020/0373807 A1 | 11/2020 | Hwang et al. |

FOREIGN PATENT DOCUMENTS

| | | |
|---|---|---|
| EP | 0 697 759 A1 | 2/1996 |
| JP | 1-285294 | 11/1989 |
| JP | 2015-208501 | 11/2015 |
| JP | 6046977 | 12/2016 |
| KR | 1986-0002024 | 11/1986 |
| KR | 10-1992-0010403 | 11/1992 |
| KR | 10-0359876 | 1/2003 |
| KR | 10-0557546 | 3/2003 |
| KR | 10-0640803 | 11/2006 |
| KR | 10-2007-0066343 | 6/2007 |
| KR | 10-0898163 | 5/2009 |
| KR | 10-0934000 | 12/2009 |
| KR | 10-0982536 | 9/2010 |
| KR | 10-2011-0025572 | 3/2011 |
| KR | 10-1026083 | 3/2011 |
| KR | 10-1026084 | 3/2011 |
| KR | 10-1054421 | 8/2011 |
| KR | 10-1072462 | 10/2011 |
| KR | 10-1130978 | 3/2012 |
| KR | 10-1165411 | 7/2012 |
| KR | 10-1206276 | 11/2012 |
| KR | 10-1345326 | 12/2013 |
| KR | 10-1639023 | 7/2016 |
| KR | 10-2017-0089755 | 8/2017 |
| KR | 10-1791010 | 10/2017 |
| KR | 10-1852114 | 4/2018 |
| KR | 10-2018-0124623 | 11/2018 |
| KR | 10-2068390 | 1/2020 |
| KR | 10-2020-0139482 | 12/2020 |

OTHER PUBLICATIONS

Machine translation of CN-107083644-A, dated Aug. 22, 2017. (Year: 2017).*

International Search Report issued in International Application No. PCT/KR2022/018102 dated Mar. 15, 2023.

Written Opinion issued in International Application No. PCT/KR2022/018102 dated Mar. 15, 2023.

* cited by examiner

WASHING MACHINE

CROSS-REFERENCE TO RELATED APPLICATION(S)

This application is a continuation application, under 35 U.S.C. § 111(a), of international application No. PCT/KR2022/018102, filed on Nov. 16, 2022 which claims priority to Korean Patent Application No. 10-2022-0020390, filed on Feb. 16, 2022, in the Korean Intellectual Property Office, the disclosure of which is incorporated by reference herein in its entirety

BACKGROUND

1. Field

The disclosure relates to a washing machine, and more particularly, to a washing machine including an improved structure to improve a motor efficiency.

2. Description of Related Art

Currently, various types of washing machines are being commercialized. The washing machine may be classified into a vertical washing machine (a top load washing machine) in which a rotary tub storing laundry rotates in an approximately vertical axis, and a drum type washing machine in which a rotary tub storing laundry rotates approximately in a horizontal axis or an inclined axis. Recently, the drum-type washing machine has become popular. All of these washing machines are driven by motors.

As for the drum type washing machine, a series of washing processes such as a wash cycle, a rinse cycle, and a spin-dry cycle are performed by rotating the drum containing the laundry. In the wash or rinse cycles that rotates laundry containing a large amount of water, a high torque at a low speed is required. In the spin-dry cycle that rotates laundry to remove moisture from the laundry, a low torque at a high speed is required.

Therefore, the motor that drives the washing machine needs to respond to this rotational force. For this purpose, a speed reducer and a clutch are generally used. For example, a pulley and a belt are provided between the motor and an output shaft, or a plurality of gears such as a planetary gear mechanism is provided for the deceleration. In addition, it is possible to switch a driving state by using a clutch.

In addition to the washing machine (indirect drive type) in which the motor indirectly drives a driving object, as described above, there is also a washing machine (direct drive type) in which a motor directly drives a driving object. For this purpose, a transmission motor in which a transmission is added to the motor may be applied to the washing machine.

However, in the use of the transmission motor, lubricating oil and a gear box for shielding are used for cooling a gear inside the motor. Accordingly, a height of the entire motor is increased and thus a distance between a main body and the motor is reduced, which causes an increase in a vibration noise.

SUMMARY

Therefore, it is an aspect of the disclosure to provide a washing machine including a drive device having a reduced size.

It is another aspect of the disclosure to provide a washing machine including a drive device including an air-cooling structure.

It is another aspect of the disclosure to provide a washing machine including a drive device having a reduced noise.

It is another aspect of the disclosure to provide a washing machine including a drive device capable of implementing a slim design with a high efficiency.

Additional aspects of the disclosure will be set forth in part in the description which follows and, in part, will be obvious from the description, or may be learned by practice of the disclosure.

In accordance with an aspect of the disclosure, a washing machine includes a main body, a tub inside the main body, a drum configured to be rotated inside the tub, and a drive device configured to rotationally drive the drum. The drive device includes a drum shaft connected to the drum, a motor including a stator and a rotor configured to be rotated by an interaction with the stator, a sun gear connected to the rotor, a carrier connected to the drum shaft, a planetary gear configured to transmit a rotational force of the sun gear to the carrier, and a cooling flow path formed therein and through which aft is introduced and discharged to cool the planetary gear. The cooling flow path includes a first cooling hole formed in the sun gear to allow outside air to be introduced, and a second cooling hole formed in the rotor to allow inside air to be discharged.

The first cooling hole may include a first vane formed in a direction opposite to a rotation direction R of the sun gear to allow the outside air to be introduced in response to a rotation of the sun gear.

The first vane may have in a form of a radial rib.

The radial rib of first vane may be arranged at an angle.

Each of first vane may be arranged to be spaced apart from an adjacent one of the vanes in a circumferential direction of the first cooling hole.

The second cooling hole may include a second vane formed in the rotation direction R of the sun gear to allow inside the air to be discharged in response to the rotation of the rotor.

The first vane and the second vane may be formed in opposite directions to each other.

The first cooling hole and the second cooling hole may be spaced apart from each other.

The first cooling hole may be located closer to the drum shaft than the second cooling hole.

The air introduced through the first cooling hole may be moved toward the planetary gear.

The rotor may include a bottom wall formed in a circular shape, and a peripheral wall formed around the bottom wall. The bottom wall may include the second cooling hole formed therein.

The sun gear may include a sun gear body coupled to the bottom wall of a rotor case, and a gear member extending from the sun gear body to face the peripheral wall, the gear member including a gear formed on an outer peripheral surface thereof. The sun gear body may have the first cooling hole formed therein.

The rotor may further include a plurality of heat dissipation holes formed in a radial direction around an outer periphery of the bottom wall, and a heat dissipation blade to guide air to the heat dissipation hole. The second cooling hole may be located closer to the drum shaft than the heat dissipation hole.

In accordance with another aspect of the disclosure, a washing machine includes a main body, a tub inside the main body, a drum configured to be rotated inside the tub, and a drive device configured to rotationally drive the drum. The drive device includes a drum shaft connected to the drum, a motor including a stator and a rotor configured to be rotated by an interaction with the stator, a sun clear connected to the rotor, a carrier connected to the drum shaft, a planetary gear configured to transmit a rotational force of the sun gear to the carrier, a first cooling hole formed in the sun gear to allow outside air to be introduced toward the planetary gear, a second cooling hole formed in the rotor to allow inside air to be discharged, a first vane formed in the first cooling hole to be in a direction opposite to a rotation direction R of the sun gear, and a second vane formed in the second cooling hole to be in the rotation direction R of the sun gear.

The first vane and the second vane may be in a form of a radial rib.

The first vane and the second vane may be formed in opposite directions to each other.

The first vane and the second vane may be formed at an angle in opposite directions to each other.

The first cooling hole may be located closer to the drum shaft than the second cooling hole.

The rotor may further include a plurality of heat dissipation holes formed in a radial direction around an outer periphery of the bottom wall, and a heat dissipation blade to guide air to the heat dissipation hole. The second cooling hole may be located closer to the drum shaft than the heat dissipation hole.

In accordance with another aspect of the disclosure, a washing machine includes a drive device configured to rotate a drum shaft of a drum. The drive device includes a stator, a rotor configured to be rotated by an interaction with the stator, a sun gear connected to the rotor, a carrier connected to the drum shaft, a planetary gear configured to transmit a rotational force of the sun gear to the carrier, a first cooling hole including a first vane formed in a direction opposite to a rotation direction of the sun gear to allow outside air to be introduced toward the planetary gear, and a second cooling hole including a second vane formed in the rotation direction of the sun gear to allow inside air to be discharged.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
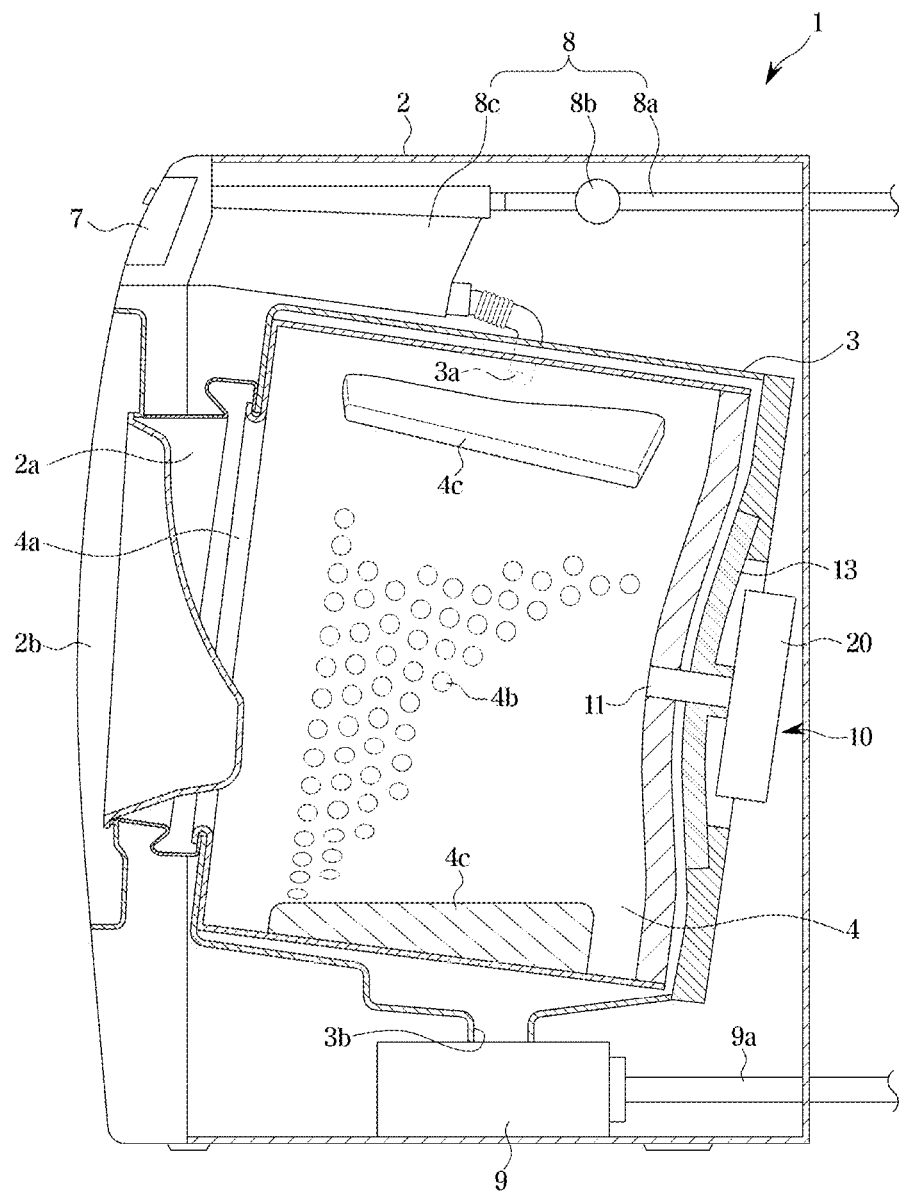
FIG. 1 is a cross-sectional view schematically illustrating a washing machine according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "front", "rear", "left", "right", and the like may be defined by the drawings, but the shape and the location of the component is not limited by the term.

The disclosure will be described more fully hereinafter with reference to the accompanying drawings.

Figure 2:
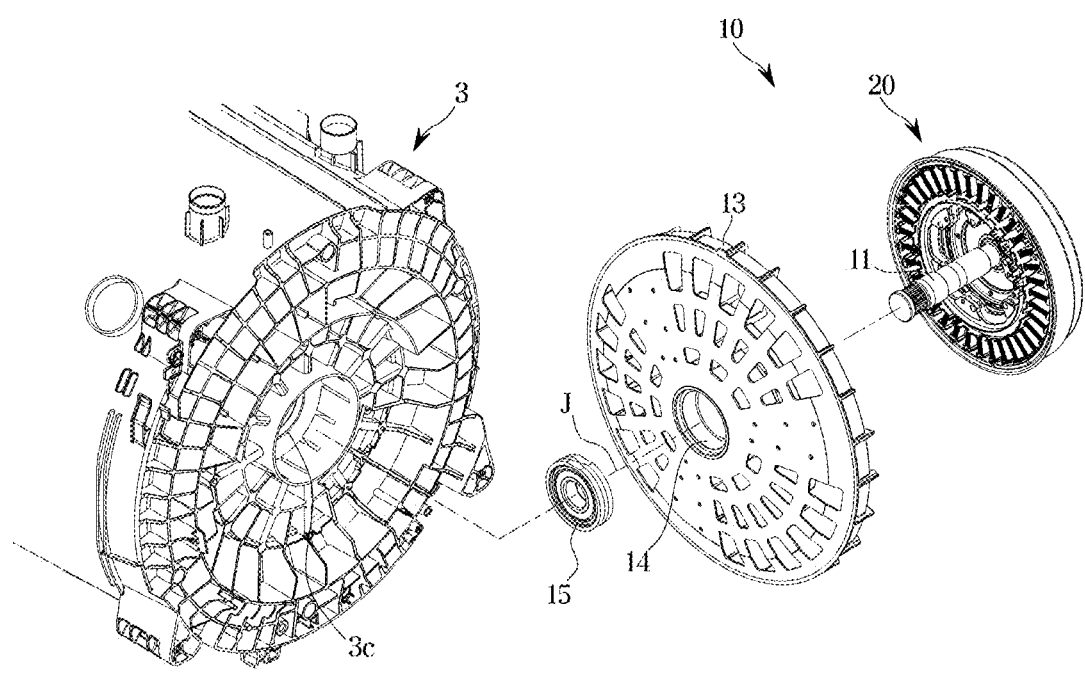
FIG. 2 is an exploded view illustrating a tub and a drive device according to an embodiment of the disclosure.

FIG. 1 is a cross-sectional view schematically illustrating a washing machine according to an embodiment of the disclosure, and FIG. 2 is an exploded view illustrating a tub and a drive device according to an embodiment of the disclosure.

As illustrated in FIGS. 1 and 2, a washing machine 1 may be a drum type washing machine. The washing machine 1 is configured to automatically perform a series of washing processes including wash, rinse, and spin-dry cycles.

The washing machine 1 may include a main body 2, a tub 3, a drum 4, and a drive device 10.

The main body 2 is a box-shaped container composed of a panel or a frame, and forms an exterior of the washing machine 1. A circular inlet 2a is formed on a front surface of the main body 2 to put laundry into and draw the laundry from the washing machine.

A door 2b including a transparent window may be installed in the inlet 2a. The inlet 2a may be opened and closed by the door 2b.

A manipulator 7 provided with a switch operated by a user may be installed in an upper portion of the main body 2.

The tub 3 communicating with the inlet 2a is installed inside the main body 2. The tub 3 is provided with a cylindrical container that includes a bottom and stores water. An opening of the tub 3 is connected to the inlet 2a. In the main body 2, the tub 3 is supported by a damper so as to be stabilized in a position in which the tub is inclined upward toward a front side of a center line J.

A water supply device 8 including a water supply pipe 8a, a water supply valve 8b, and a detergent input device 8c is provided above the tub 3. The water supply pipe 8a may be connected to a water supply source (not shown) provided outside the washing machine 1.

A downstream end of the water supply pipe 8a is connected to a water supply port 3a formed by opening a part of an upper portion of the tub 3. The water supply valve 8b and the detergent input device 8c are sequentially installed in the middle of the water supply pipe 8a from the upstream side of the water supply pipe 8a.

The detergent input device 8c is provided to receive a detergent, mix the received detergent with the supplied water and put the water containing the detergent into the tub 3. A drain port 3b is provided under the tub 3. The drain port 3b is connected to a drain pump 9. The drain pump 9 may discharge the water stored in the tub 3 to the outside of the washing machine 1 through a drain pipe 9a.

The drum 4 is provided with a cylindrical container with a smaller diameter than the tub 3, and is installed in the tub 3 in a state in which the drum 4 and the tub 3 are aligned with respect to the center line J. A circular opening 4a corresponding to the inlet 2a is formed in the front of the drum 4. Laundry may be put into the drum 4 through the inlet 2a and the circular opening 4a.

A plurality of through holes 4b is formed in the drum 4. A lifter 4c for stirring may be installed in the drum 4. A front portion of the drum 4 is rotatably supported by the inlet 2a.

The drive device 10 may be installed at a rear side of the tub 3. The drive device 10 may include a drum shaft 11, a base 13, and a motor 20.

The drum shaft 11 may be provided to protrude into the tub 3 by passing through a rear member 3c of the tub 3. One end of the drum shaft 11 is fixed approximately at a center of the rear member of the drum 4.

A rear portion of the drum 4 is pivotally supported on the drum shaft 11. The drive device 10 directly drives the drum 4. Accordingly, the drum 4 is rotated around the center line J by driving the motor 20.

The center line J may correspond to a rotation axis J. Because the washing machine 1 is a drum type, the rotation axis is arranged to extend in a direction inclined with respect to the horizontal direction or in a substantially horizontal direction.

Figure 3:
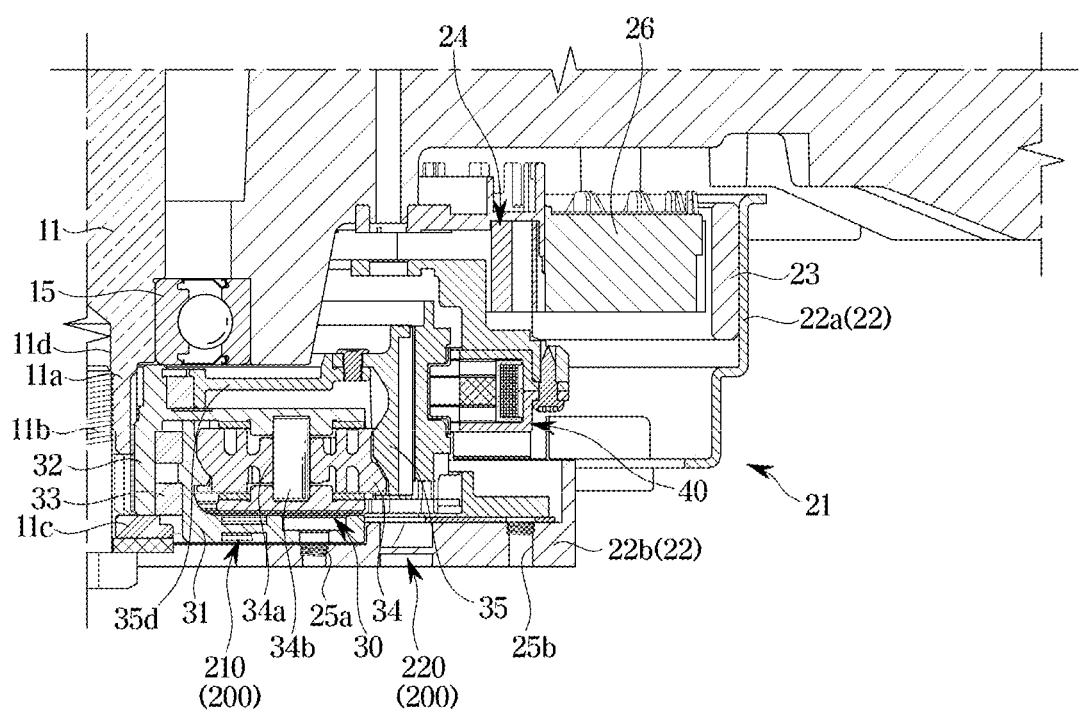
FIG. 3 is a cross-sectional view illustrating the drive device shown in FIG. 2.
Figure 4:
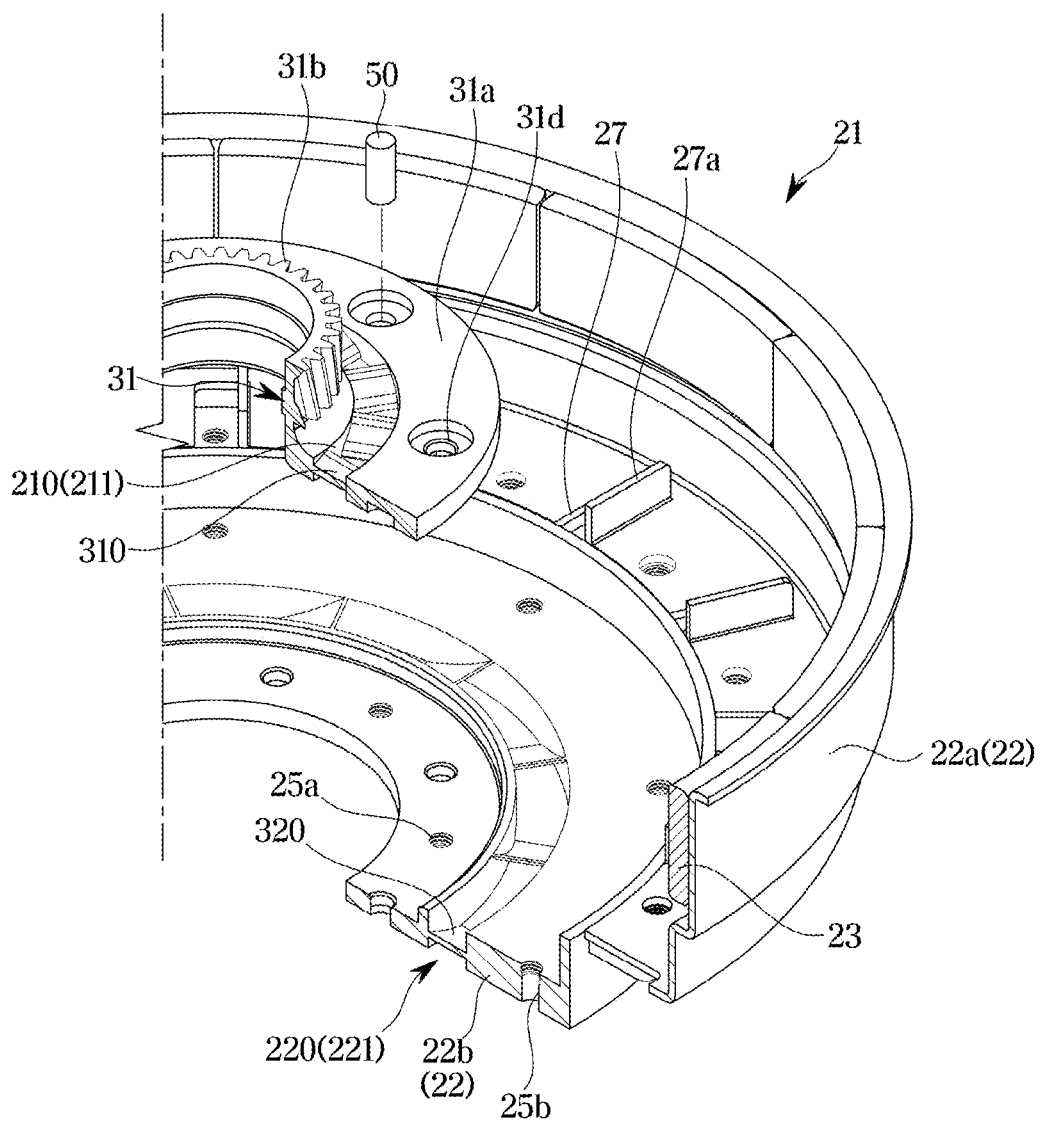
FIG. 4 is a view illustrating a sun gear and a rotor of the drive device shown in FIG. 3.
Figure 5:
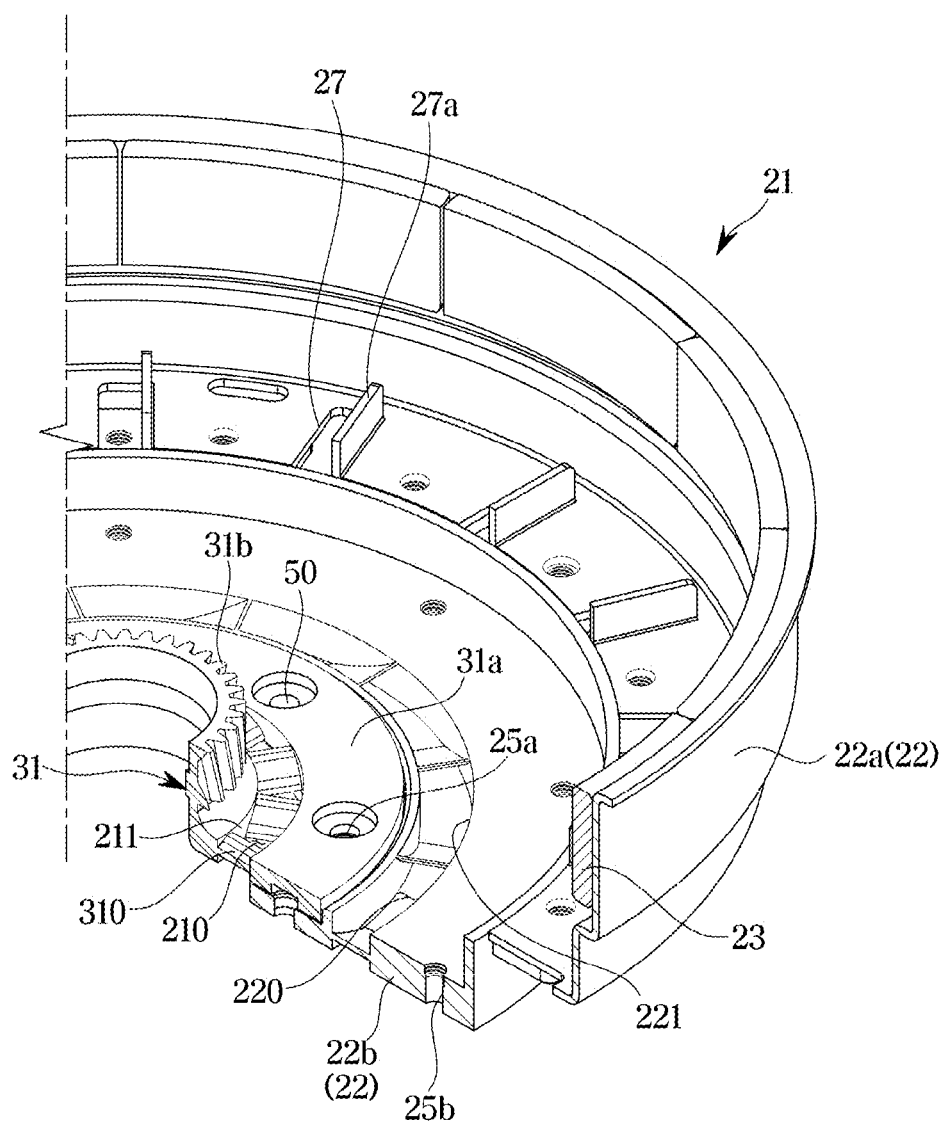
FIG. 5 is a view illustrating a cooling flow path of the rotor and the sun gear shown in FIG. 3.

FIG. 3 is a cross-sectional view illustrating the drive device shown in FIG. 2, FIG. 4 is a view illustrating a sun gear and a rotor of the drive device shown in FIG. 3, and FIG. 5 is a view illustrating a cooling flow path of the rotor and the sun gear shown in FIG. 3.

Referring to FIGS. 3 and 5, the drive device 10 may include the drum shaft 11, the base 13, and the motor 20.

The base 13 is provided with a substantially disk-shaped metal or resin member installed at the bottom of the tub 3. A shaft insertion hole 14 formed in a cylindrical shape and extending along the center line is formed in the center of the base 13. A pair of bearings 15 may be mounted at opposite ends of the shaft insertion hole 14.

The drum shaft 11 may be formed of a cylindrical metal member having a smaller diameter than the shaft insertion hole 14. The drum shaft 11 is inserted into the shaft insertion hole 14 in a state in which one end of the drum shaft 11 protrudes from the shaft insertion hole 14. Because the drum shaft 11 is supported by the base 13 through the pair of bearings 15, the drum shaft 11 is configured to be rotated about the rotation axis.

The motor 20 may be provided to be suitable for driving the washing machine 1. That is, in the washing machine 1, each of wash, rinse, and spin-dry cycles is performed. For this, the motor 20 requires a high torque output at a low-speed rotation, and a low torque output at a high-speed rotation.

Generally, a method of indirectly rotating the drum by interposing a reducer and a clutch between the drum and the motor (indirect drive method), or a method of directly rotating the drum by driving the motor by an inverter control (direct drive method) is employed.

As for the drive device 10, research has been made to ease the difficulty of each method by efficiently combining the indirect drive method and the direct drive method. That is, the washing machine 1 has a compact size, but has a large washing capacity, low noise, and obtains energy saving and the like.

Particularly, in the motor 20 configured to rotate one drum shaft 11 corresponding to an output shaft, a planetary gear assembly 30 and a clutch 40 provided between the drum shaft 11 and the motor 20 may be efficiently integrated with each other.

Accordingly, the motor 20, the planetary gear assembly 30, and the clutch 40 are arranged in a line in a direction substantially perpendicular to the rotation axis J, and thus it is possible to reduce a thickness of the motor 20.

A rear end 11a of the drum shaft 11 protrudes from the bearing 15. A screw hole 11d extending along the center line J is formed in the rear end 11a of the drum shaft 11. A serration extending along the center line J is formed on an outer peripheral surface of the rear end 11a of the drum shaft 11. A retainer 11c is provided in the screw hole 11d, and a bolt 11b is fastened to the retainer 11c.

With the configuration, a carrier 32 to be described later may be fixed to the rear end 11a of the drum shaft 11.

The motor 20 may include a rotor 21 and a stator 24. The motor 20 is an outer rotor type in which the rotor 21 is arranged outside the stator 24.

As illustrated in FIG. 4, the rotor 21 may include a rotor case 22 and a plurality of magnets 23. The rotor case 22 is formed with a member having a cylindrical shape including a bottom in which a center coincides with the rotation axis J.

The rotor case 22 may include a bottom wall 22b formed in a disk-shape and including a circular hole in a center thereof, and a peripheral wall 22a formed in a cylindrical shape and continuous around the bottom wall 22b.

The bottom wall 22b may be multi-piece or single piece. The rotor case 22 includes a bottom that is shallow (small thickness), and a height of the peripheral wall 22a is less than a radius of the bottom wall 22b.

The magnet 23 may be provided in plurality. Each magnet 23 is provided with a rectangular permanent magnet that is bent in an arc shape. The magnet 23 is arranged in series in a circumferential direction and fixed to an inner surface of the peripheral wall 22a of the rotor case 22. The magnet 23 forms a magnetic pole of the rotor 21, and is arranged such that a S pole and a N pole are alternately side by side.

A heat dissipation hole 27 provided to dissipate heat may be formed in an outer edge of the bottom wall 22b of the rotor case 22. The heat dissipation hole 27 may be provided to discharge heat generated from the motor 20. The heat dissipation hole 27 may be formed in plurality. The heat dissipation hole 27 may be formed to have a length in a radial direction. A heat dissipation blade 27a bent and extended to guide air to the heat dissipation hole 27 may be provided in the heat dissipation hole 27. The heat dissipation blade 27a may be provided in each heat dissipation hole 27.

A discharge hole (second cooling hole) 221 forming a part of a cooling flow path 200 for cooling the planetary gear assembly 30 may be provided in the bottom wall 22b of the rotor case 22. The discharge hole 221 may be provided to discharge the high-temperature air inside the rotor case 22. The discharge hole 221 may be a second cooling hole 220.

A detailed description of the rotor case 22 and the discharge hole 221 will be described later.

A sun gear 31 may be coupled to the center of the bottom wall 22b of the rotor case 22. The sun gear 31 may be provided to transmit a rotational force by being coupled to the planetary gear assembly 30 to be described later. The sun gear 31 may be provided to face the peripheral wall 22a of the rotor case 22. The sun gear 31 may be coupled to the bottom wall 22b of the rotor case 22 by a fastening member 50. A gear member 31c in which a gear 31b is formed may be provided on an outer peripheral surface of the sun gear 31. The sun gear 31 may be provided with an inlet hole (first cooling hole) 211 forming a part of the cooling flow path 200 for cooling the planetary gear assembly 30. The inlet hole 211, through which outside air is introduced to prevent a temperature rise of the planetary gear assembly 30, may be formed in the sun gear 31. The inlet hole 211 may be a first cooling hole 210. A detailed description of the sun gear 31 and the inlet hole 211 will be described later.

Figure 6:
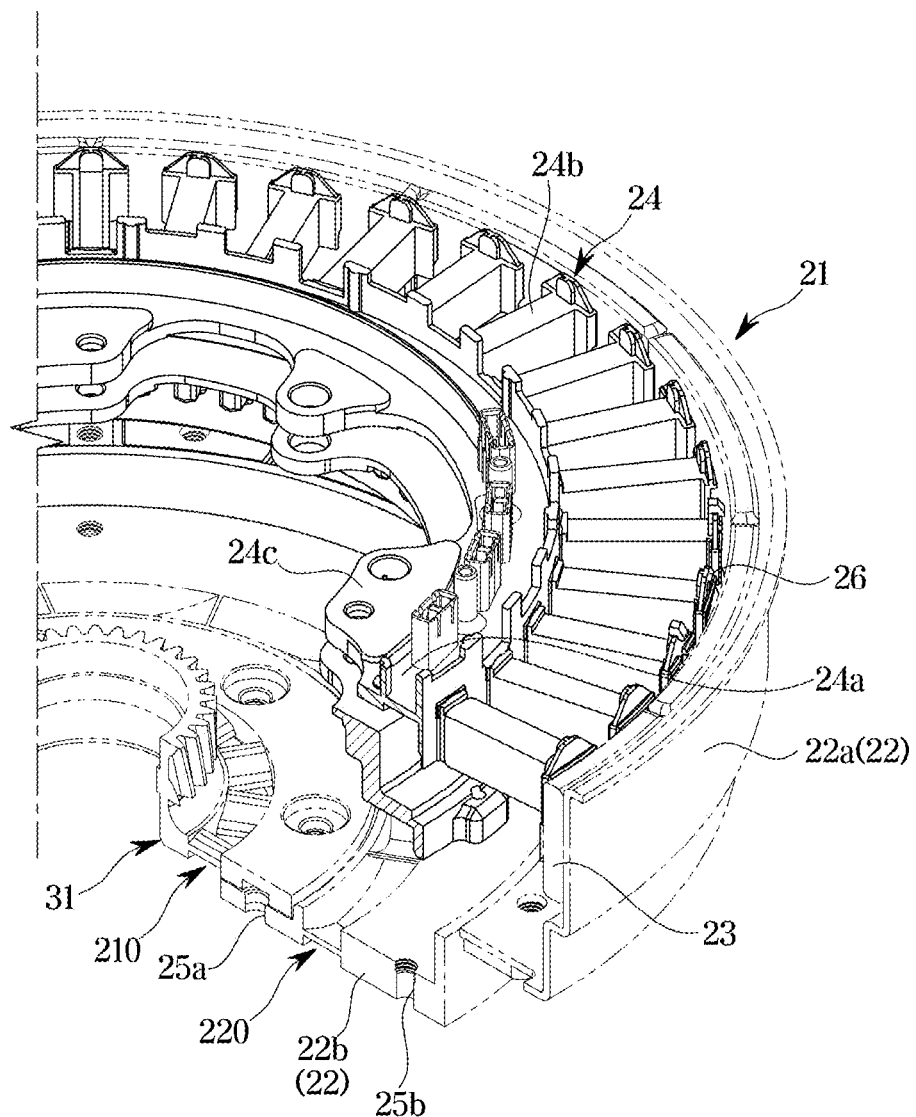
FIG. 6 is a view schematically illustrating the cooling flow path and a stator of the drive device shown in FIG. 3.
Figure 7:
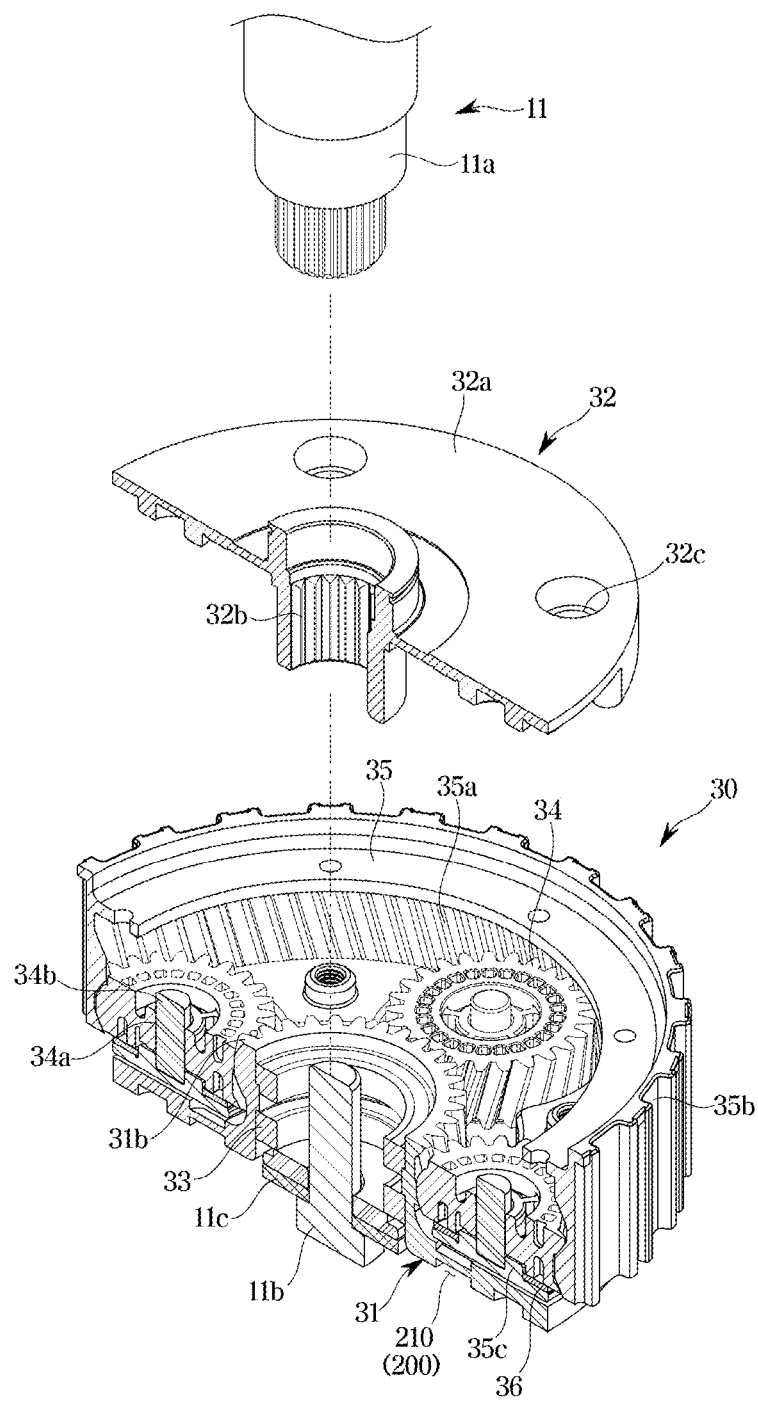
FIG. 7 is a view schematically illustrating the cooling flow path and a planetary gear assembly of the drive device shown in FIG. 3.

FIG. 6 is a view schematically illustrating the cooling flow path and a stator of the drive device shown in FIG. 3, and FIG. 7 is a view schematically illustrating the cooling flow path and a planetary gear assembly of the drive device shown in FIG. 3. Hereinafter a description the same as the above description will be omitted.

As illustrated in FIGS. 6 and 7, the stator 24 may be formed of a circular ring (annular) member, and may include a core member 24a formed in a circular ring shape, and a plurality of teeth 24b protruding radially outward from the core member 24a.

The stator 24 may be fixed to the base 13 through a fixing flange 24c provided inside the core member 24a. The stator 24 may be received in the rotor case 22.

The core member 24a and each tooth 24b are provided in such a way that a surface of a magnetic stator core 26 formed of a metal material having magnetic properties is covered by an insulator.

Although not illustrated, a plurality of coils is formed in each tooth 24b by winding a conducting wire in a predetermined order. A part of the stator core 26 is exposed at an end of each tooth 24b located on an outer peripheral portion of the stator 24. The exposed part of the stator core 26 is diametrically opposed to the magnet 23 of the rotor 21 with a predetermined gap.

The plurality of coils forms a three-phase coil group composed of U, V and W phases. As a controller (not shown) controls an inverter (not shown), each of the coil groups supplies an alternating current (AC) while changing the phase. Accordingly, a magnetic field is formed between each coil group and the magnet of the rotor 21. Due to the action of the magnetic force, the rotor 21 is rotated about the rotation axis J.

The planetary gear assembly 30 may connect the rotor 21 and the drum shaft 11 to rotate the drum shaft 11. The planetary gear assembly 30 is received in the rotor case 22. The planetary gear assembly 30 is a speed reducer using a planetary gear device, and may include the carrier 32, the sun gear 31, a plurality of planetary gears 34, and an internal gear 35.

In the embodiment of the disclosure, four planetary gears are illustrated as an example, but the disclosure is not limited thereto. For example, the number of planetary gears may vary.

The carrier 32 may include a base 32a having a cylindrical shape including a shallow bottom, and a shaft bracket 32b formed in a cylindrical shape and protruding rearward from a center portion of the base 32a. A plurality of shaft supporters 32c may be formed on a rear surface of the base 32a.

A serration coupled to the rear end 11a of the drum shaft 11 may be formed on an inner peripheral surface of the shaft bracket 32b. As the rear end 11a of the drum shaft 11 is inserted into the shaft bracket 32b, the carrier 32 may be non-rotatably fixed to the drum shaft 11. The sun gear 31 is supported around the shaft bracket via a carrier bearing 33.

The sun gear 31 may be rotated about the rotation shaft 11.

The carrier bearing 33 formed in cylindrical shape is fixed inside the sun gear 31. The sun gear 31 may be slidably supported on the drum shaft 11 through the carrier bearing 33. Particularly, through the carrier bearing 33, the sun gear 31 may be supported in a slidable state on the carrier 32 fixed to the drum shaft 11.

Accordingly, the rotor case 22 is configured to be rotated with respect to the drum shaft 11. The rotor case 22 may be coupled to the sun gear 31 through the fastening member 50. A first fastening hole 25a formed in a circumferential direction and a second fastening hole 25b radially spaced apart from the first fastening hole 25a may be formed in the bottom wall 22b of the rotor case 22. The first fastening hole 25a may be arranged at a center side rather than the second fastening hole 25b. A plurality of first fastening holes 25a may be arranged to be spaced apart from each other.

A fixing hole 31d may be provided in the sun gear 31 to allow the fastening member 50 to be coupled thereto. The fixing hole 31d may be formed in plurality. The fixing holes 25b may be arranged to be spaced apart from the sun gear 31 with respect to the circumferential direction. The fixing hole 31d may be provided to correspond to the first fastening hole 25a of the rotor case 22. The sun gear 31 may be coupled to the rotor case 22 by the fastening member 50 passing through the fixing hole 31d. The fixing hole 31d of the sun gear 31 may be coupled to the first fastening hole 25a of the rotor case 22. The rotor case 22 may be rotated with respect to the drum shaft 11 by the sun gear 31.

The internal gear 35 is provided with a cylindrical member having a relatively larger diameter than the sun gear 31. An internal gear member 35a is provided on an inner peripheral surface of the internal gear 35. A gear tooth is formed along an entire circumference of the internal gear member 35a. Further, on an outer peripheral surface of the internal gear 35, a plurality of inner slide guides 35b including a linear protrusion extending along a rotation axis direction is formed along the entire circumference at regular intervals.

The internal gear 35 is arranged around the sun gear 31 with respect to the rotation axis J. The internal gear 35 may include a first cover 35c provided to cover at least a part of a lower portion of the planetary gear 34. The internal gear 35 may include a second cover 35d (refer to FIG. 3) provided to cover at least a part of an upper portion of the planetary gear 34.

The covers 35c and 35d of the internal gear 35 may extend in the radial direction. It is possible to reduce a size of the motor 20 of the drive device 10 because the internal gear 35 includes the covers 35c and 35d provided to cover one surface of the planetary gear 34.

In addition, as the size of the motor 20 is reduced, a gap may be generated between the tub 3 and the motor 20 in response to the drive device 10 being coupled to the rear side of the tub 3. Accordingly, the gap may prevent damage to the motor caused by a vibration of the tub 3.

The planetary gear 34 is rotatably supported by the carrier 32, and is arranged between the sun gear 31 and the internal gear 35 to mesh with the sun gear 31 and the internal gear 35. The planetary gear 34 may be provided to transmit the rotational force of the sun gear 31 to the carrier 32.

One side of the planetary gear 34 with respect to the rotation axis direction may be covered by the carrier 32 and the other side of the planetary gear 34 with respect to the rotation axis direction may be covered by the internal gear 35. In the planetary gear 34, at least a part of one surface, into which a planetary gear shaft 34b is inserted, may be covered by the carrier 32. In the planetary gear 34, at least a part of a surface opposite to the one surface into which the planetary gear shaft 34b is inserted may be covered by the internal gear 35. Particularly, as for the planetary gear 34, at least a part of the surface opposite to the one surface into which the planetary gear shaft 34b is inserted may be covered by the covers 35c and 35d of the internal gear 35.

The planetary gear 34 is provided with a gear member having a relatively small diameter. A shaft insertion groove 34a is formed in a substantially central portion of each planetary gear 34. One end of the planetary gear shaft 34b inserted into the shaft insertion groove 34a may be supported by the shaft supporter 32c of the carrier 32. That is, the planetary gear shaft 34b may be rotatably coupled to one side of the planetary gear 34, and fixed to the carrier 32. On the outer peripheral surface of each planetary gear 34, gear teeth are formed along the entire circumference. The tooth of the gear meshes with the sun gear 31 and the internal gear 35.

In response to the rotation of the sun gear 31 at a predetermined speed in a state in which the internal gear 35 is fixed (not rotatable), each planetary gear 34 is rotated while orbiting the sun gear 31. Accordingly, the carrier 32 and the drum shaft 11 are rotated at a reduced-speed.

A bush bearing 36 may be arranged between the internal gear 35 and the sun gear 31. The bush bearing 36 may be formed in a ring shape. As the bush bearing 36 is provided between the internal gear 35 and the sun gear 31, the internal gear 35 may be rotated with respect to the sun gear 31.

The clutch 40 is arranged around the planetary gear assembly 30. The clutch may be received in the rotor case 22. The clutch 40 may include a slider 41, a rotor side-locking protrusion and a stator side-locking protrusion (not shown), which are a fixed member, and a clutch driver 43. The clutch driver 43 may include a mover 43a and a stator 43b.

The slider 41 is provided with a cylindrical member having a larger diameter than the internal gear 35. On an inner peripheral surface of the slider 41, an outer slide guide 41a including a linear protrusion extending the rotation axis direction is formed along the entire circumference at regular intervals. The outer slide guide 41a is provided to mesh with the plurality of inner slide guides 35b formed on the outer peripheral surface of the internal gear 35.

The slider 41 is arranged around the internal gear 35 in a state in which the outer slide guide 41a meshes with the inner slide guide 35b of the internal gear 35. Accordingly, the slider 41 is slidable in the rotation axis direction.

A pair of hooking protrusions (not shown) provided with a rotor-side hooking protrusion and a stator-side hooking protrusion are formed on an outer peripheral surface of the slider 41. The hooking protrusion is composed of a plurality of protrusions protruding in the rotation axis direction. The hooking protrusion may be formed along the entire circumference at regular intervals on the outer peripheral surface of the slider 41.

Although not shown, the rotor-side locking protrusion may be provided on an annular member mounted on the rotor case 22, and the stator-side locking protrusion may be provided on an annular member of the stator 24. The rotor-side locking protrusion and the stator-side locking protrusion are arranged to face each other in the rotation axis direction. The rotor-side locking protrusion is provided to mesh with the rotor-side hooking protrusion, and at the same time, the stator-side locking protrusion is provided to mesh with the stator-side hooking protrusion.

In addition, an interval between the rotor-side locking protrusion and the stator-side locking protrusion is set to be greater than an interval between the rotor-side hooking protrusion and the stator-side hooking protrusion. Therefore, in response to the rotor-side locking protrusion meshing with the rotor-side hooking protrusion, the stator-side locking protrusion may not mesh with the stator-side hooking protrusion. In response to the stator-side locking protrusion meshing with the stator-side hooking protrusion, the rotor-side locking protrusion may not mesh with the rotor-side hooking protrusion.

Accordingly, in a first mode in which the stator-side hooking protrusion meshes with the stator-side locking protrusion, the internal gear 35 may be supported by the stator 24 through the slider 41. Accordingly, the rotation of the rotor 21 and the sun gear 31 may be transmitted to the drum shaft 11 and the carrier 32 through the planetary gear assembly 30.

Further, in a second mode in which the rotor-side hooking protrusion meshes with the rotor-side locking protrusion, the internal gear 35 may be supported by the rotor 21 through the slider 41. Accordingly, the rotation of the rotor 21 and the sun gear 31 may be transmitted to the drum shaft 11 and the carrier 32 without passing through the planetary gear assembly 30. That is, because the rotor 21, the sun gear 31, and the internal gear 35 are rotated as one unit, the planetary gear 34 may not orbit. Accordingly, the drum shaft 11 and the carrier 32 may be rotated as one unit, and thus the drive device 10 may output a rotational force of low torque at a high rotation.

As mentioned above, in the drive device 10, the planetary gear assembly 30 and the clutch 40 are efficiently integrated in the motor 20 in order that the motor 20, the planetary gear assembly 30, and the clutch 40 are aligned in an approximately vertical line with respect to the rotation axis J.

Therefore, it is possible to output a rotational force of high torque at a low rotation and a rotational force of low torque at a high rotation through a single drum shaft 11 by switching the clutch 40.

In addition, because the rotation speed and torque value of the motor 20 are set to relatively close values even in the two modes of the first mode and the second mode having different outputs, it is possible to optimize a motor efficiency and to output an appropriate rotational force for the washing machine with the motor having a compact design.

In the operation of the washing machine 1, the motor 20 generates heat. Particularly, the planetary gear assembly 30 of the motor 20 may be mounted on the sun gear 31 coupled to the internal gear 35. The planetary gear 34 may be rotatably coupled to the planetary gear shaft 34b inserted into the carrier 32. The planetary gear 34 may be provided in plurality. The drive device 10 may include the cooling flow path 200 provided to cool heat generated by the rotation of the plurality of planetary gears meshing with each other. The cooling flow path 200 may be provided to introduce outside air so as to dissipate heat of each component including the planetary gear assembly 30. Further, the cooling flow path 200 may be provided to discharge air absorbing internal heat to the outside. The cooling flow path 200 may include the first cooling hole 210 provided to introduce outside air and the second cooling hole 220 provided to discharge inside air.

Figure 8:
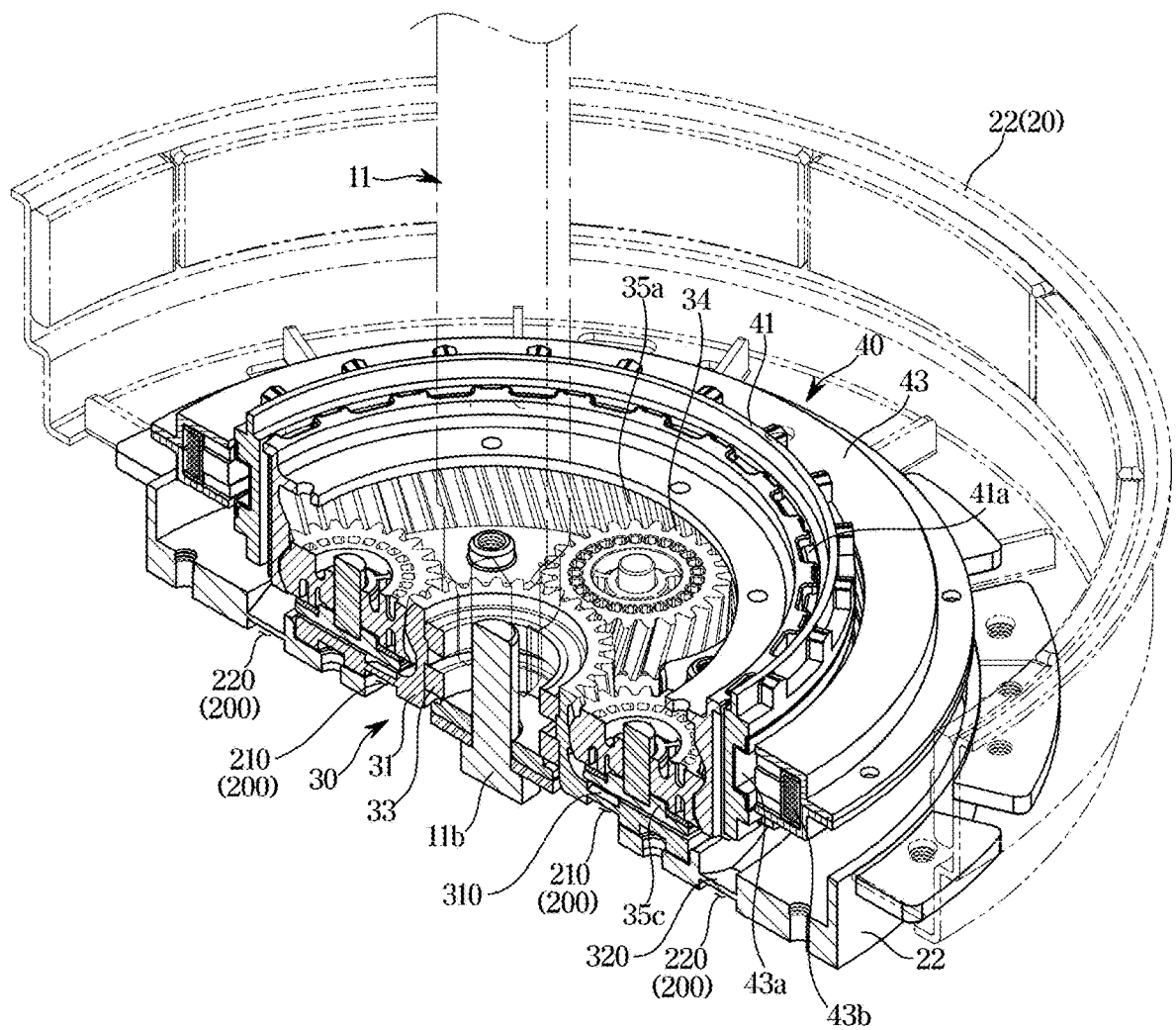
FIG. 8 is a view illustrating the cooling flow path by a first cooling hole and a second cooling hole of the drive device shown in FIG. 3.
Figure 9:
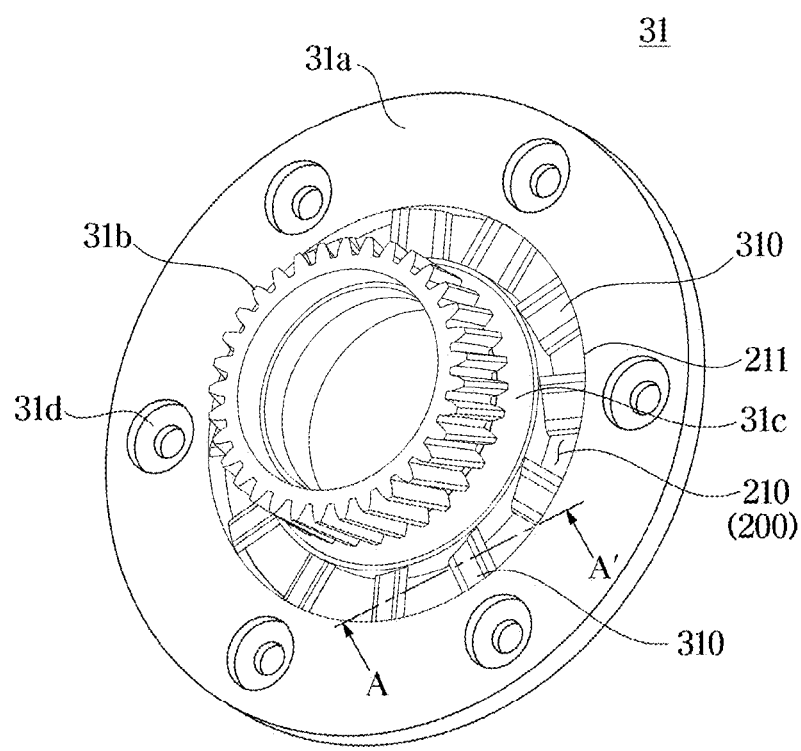
FIG. 9 is a view illustrating the first cooling hole of the sun gear shown in FIG. 8.
Figure 10:
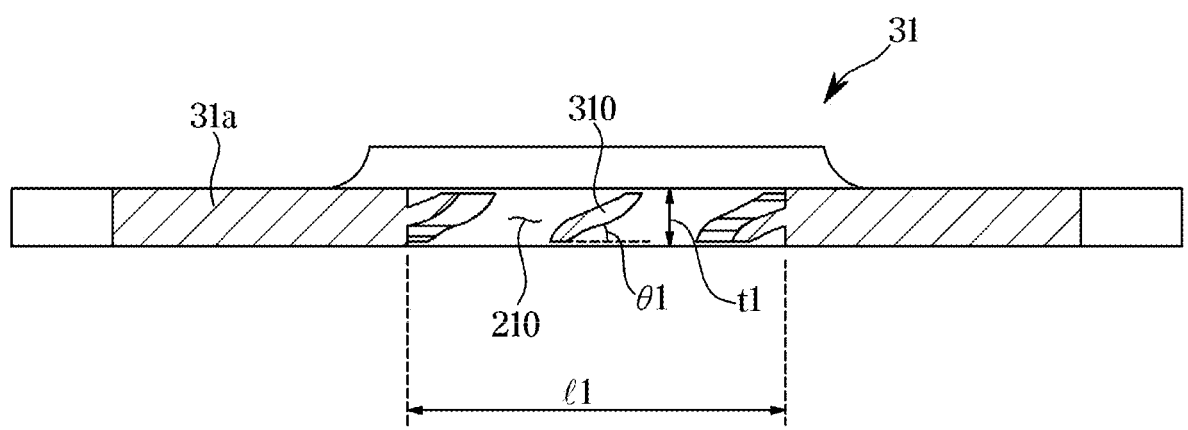
FIG. 10 is a sectional view taken along line A-A' of FIG. 9, particularly illustrating a first vane provided in the first cooling hole.
Figure 11:
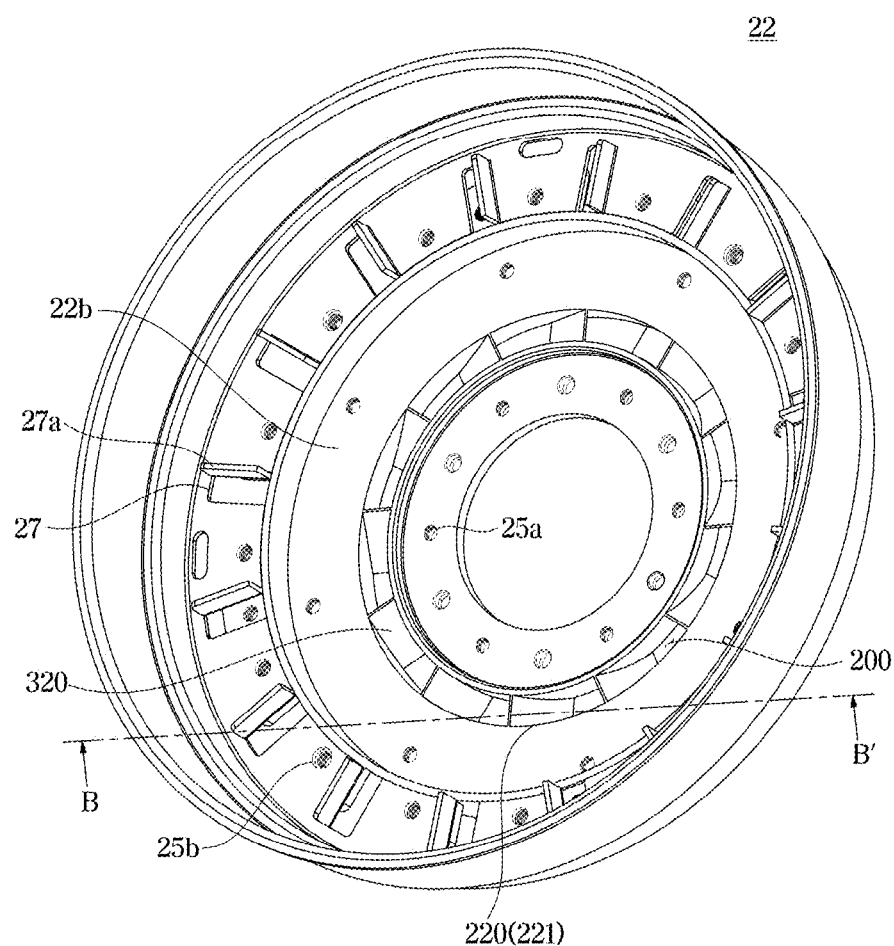
FIG. 11 is a view illustrating the second cooling hole of the rotor shown in FIG. 8.
Figure 12:
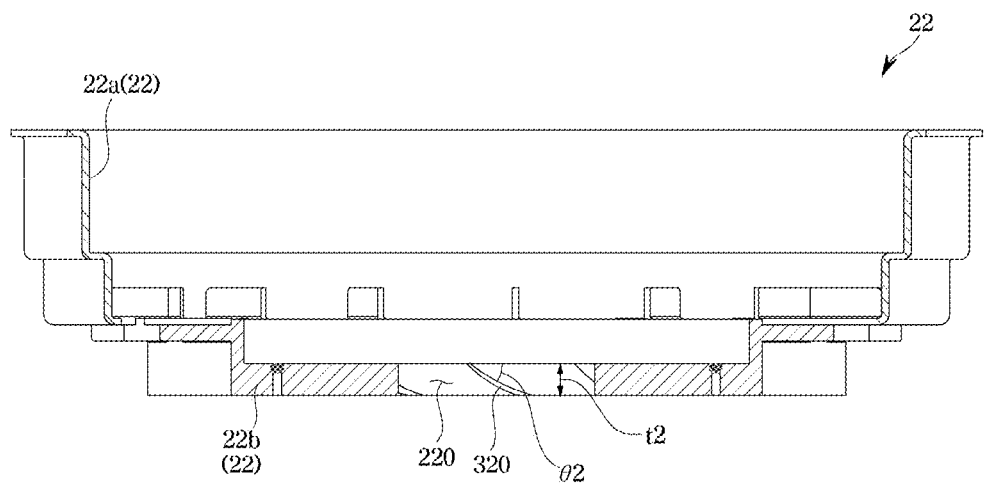
FIG. 12 is a sectional view taken along line B-B' of FIG. 9, particularly illustrating a second vane provided in the second cooling hole.

FIG. 8 is a view illustrating the cooling flow path by a first cooling hole and a second cooling hole of the drive device shown in FIG. 3, FIG. 9 is a view illustrating the first cooling hole of the sun gear shown in FIG. 8, FIG. 10 is a sectional view taken along line A-A' of FIG. 9, particularly illustrating a first vane provided in the first cooling hole, FIG. 11 is a view illustrating the second cooling hole of the rotor shown in FIG. 8, and FIG. 12 is a sectional view taken along line B-B' of FIG. 9, particularly illustrating a second vane provided in the second cooling hole.

As illustrated in FIGS. 8 to 12, the drive device 10 may include the cooling flow path 200 provided to cool the motor 20, that is, the planetary gear assembly 30.

The cooling flow path 200 may be provided for introduction and discharge of air. The cooling flow path 200 may be provided to cool the motor 20. The cooling flow path 200 may be provided to cool the planetary gear assembly 30. Particularly, the cooling flow path 200 may be provided to allow outside air to flow toward the planetary gear assembly 30.

The cooling flow path 200 may include the first cooling hole 210 formed to allow outside air to be introduced. The first cooling hole 210 may be formed in the sun gear 31. The first cooling hole 210 may include a first vane 310 provided to guide air to allow outside air to be introduced in response to a rotation of the sun gear 31.

The sun gear 31 may include a sun gear body 31a formed in a disk shape and provided to be coupled to the bottom wall 22b of the rotor case 22, and the gear member 31c extending from the sun gear body 31a and arranged to face the peripheral wall 22a of the rotor case 22. The gear 31b is provided on the outer peripheral surface of the gear member 31c.

On the inner peripheral surface of the gear member 31c of the sun gear 31, the carrier bearing 33 may be provided to allow the rear end 11a of the drum shaft 11 to be inserted and fixed thereto. The gear 31b of the sun gear 31 is provided to mesh with the planetary gear 34 of the planetary gear assembly 30.

The first cooling hole 210 may be provided in the sun gear 31. The first cooling hole 210 may be formed in the sun gear body 31a of the sun gear 31. The first cooling hole 210 may be formed in a circumferential direction of the sun gear body 31a. The first cooling hole 210 may be formed in a ring shape in the sun gear body 31a.

The first cooling hole 210 may be provided to allow outside air to be introduced to the planetary gear assembly 30 coupled to the sun gear 31. The outside air introduced through the first cooling hole 210 may move toward the planetary gear assembly 30 to form the cooling flow path 200 provided to dissipate heat of the planetary gear 34. It is appropriate that the first cooling hole 210 is formed at a position adjacent to the planetary gear 34 coupled to the sun gear 31. In the embodiment of the disclosure, it is illustrated that the first cooling hole is located at the center side of the sun gear body, but the disclosure is not limited thereto. For example, the position of the first cooling hole may be formed at a position corresponding to the planetary gear coupled to the sun gear.

In addition, the number of the first cooling holes 210 and a size of the first cooling holes 210, that is, a first length 11 or a first thickness t1 of the first cooling holes 210 may be changed according to a size of the motor 20 and the sun gear 31.

The first vane 310 may be provided in the first cooling hole 210. The first vane 310 may be provided in plurality. The first vane 310 may be provided in the form of a radial rib.

Each of the first vanes 310 may be provided to allow the outside air to be introduced through the first cooling hole 210. The first vanes 310 may be arranged to be spaced apart along the circumferential direction of the first cooling hole 210. The each of the first vanes 310 may be inclined at a first angle θ1. The first vanes 310 may be arranged in a direction opposite to a rotation direction R of the sun gear 31. The first vanes 310 may be arranged to be spaced apart from each other by a predetermined interval.

Further, the first angle θ1 of the first vane 310 may be changed according to the size of the sun gear 31 and the first cooling hole 210.

The cooling flow path 200 may include the second cooling hole 220 formed to allow inside air to be discharged. The second cooling hole 220 may be formed in the rotor 21. Particularly, the second cooling hole 220 may be provided in the rotor case 22. The second cooling hole 220 may include a second vane 320 provided to guide inside air to be discharged in response to the rotation of the rotor 21.

The rotor case 22 may include the bottom wall 22b formed in a disk-shape and including the circular hole in the center thereof, and the peripheral wall 22a formed in a cylindrical shape and continuous around the bottom wall 22b.

The heat dissipation hole 27 provided to dissipate heat may be formed in the outer edge of the bottom wall 22b of the rotor case 22. The heat dissipation hole 27 may be provided to discharge heat generated from the motor 20. The heat dissipation hole 27 may be formed in plurality. The heat dissipation hole 27 may be formed to have a length in the radial direction. The heat dissipation blade 27a provided to guide air to the heat dissipation hole 27 may be provided in the heat dissipation hole 27. The heat dissipation blade 27a may be provided in each heat dissipation hole 27.

The second cooling hole 220 may be provided in the bottom wall 22b of the rotor case 22. The second cooling hole 220 may be arranged on the center side of the rotor case 22 rather than the heat dissipation hole 27.

The second cooling hole 220 may be arranged on the center side of the heat dissipation hole 27 of the rotor case 22 to allow the dissipated air to be discharged from the planetary gear assembly 30.

The second cooling hole 220 may be formed outside the sun gear 31 fixed to the bottom wall 22b of the rotor case 22. The rotor case 22 and the sun gear 31 may be coupled through the fastening member 50. In order to allow the fastening member 50 to be coupled thereto, the first fastening hole 25a is provided in the bottom wall 22b of the rotor case 22 and a fixing hole 31d is provided in the sun gear 31. The first fastening hole 25a and the fixing hole 31d may be formed at positions corresponding to each other.

The second cooling hole 220 may be spaced apart from the first cooling hole 210 formed in the sun gear 31. The fastening member 50 provided to fix the rotor case 22 and the sun gear 31 may be provided between the second cooling hole 220 and the first cooling hole 210.

The second cooling hole 220 may be arranged on the outside of the drum shaft 11 than the first cooling hole 210.

The second cooling hole 220 may be formed in the circumferential direction of the rotor case 22. The second cooling hole 220 may be formed in a ring shape on the bottom wall 22b of the rotor case 22.

The second cooling hole 220 may be provided to discharge the inside air in the planetary gear assembly 30. Air that is dissipated and moved from the planetary gear assembly 30 side may be discharged to the outside through the second cooling hole 220. The air dissipated from the planetary gear assembly 30 side may form the cooling flow path 200 that is discharged to the outside through the second cooling hole 220. In the embodiment of the disclosure, it is illustrated that the second cooling hole is located on the center side of the rotor case, but the disclosure is not limited thereto. For example, the position of the second cooling hole may vary.

Further, the number of the second cooling holes 220 and the size of the second cooling holes 220, for example a second thickness t2 of the second cooling holes 220, may be changed according to the size of the motor 20 and the sun gear 31.

The second vane 320 may be provided in the second cooling hole 220. The second vane 320 may be provided in plurality. The second vane 320 may be provided in the form of a radial rib.

Each of the second vanes 320 may be provided to allow the inside air to be discharged through the second cooling hole 220. The second vanes 320 may be arranged to be spaced apart from each other in a circumferential direction of the second cooling hole 220. The second vane 320 may be inclined at a second angle δ2. The second vane 320 may be arranged in the rotation direction R of the sun gear 31. The second vane 320 may be arranged in a direction opposite to the direction of the first vane 310.

Further, the second angle θ2 of the second vane 320 may be changed according to the size of the sun gear 31 and the second cooling hole 220.

Figure 13:
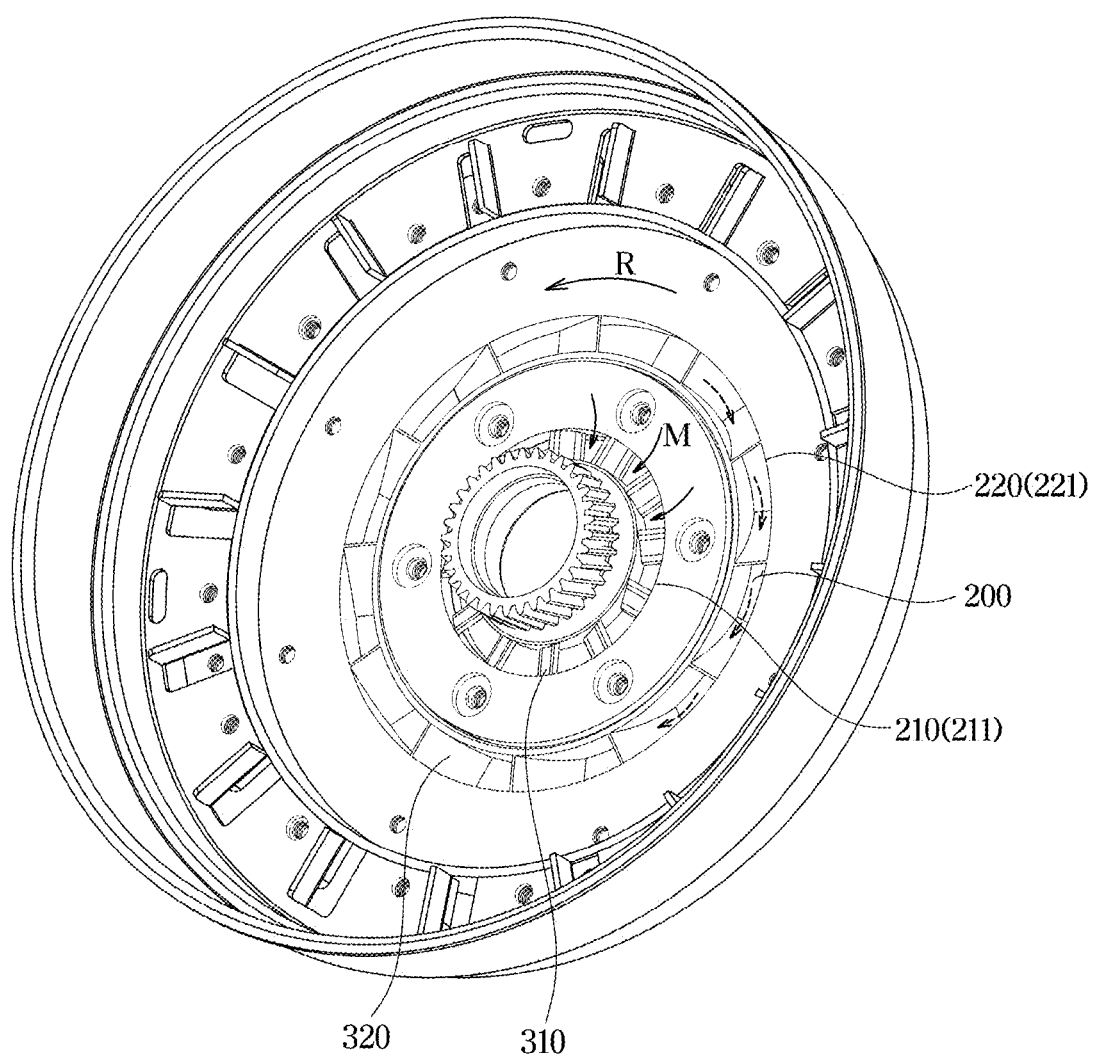
FIG. 13 is a view illustrating introduction and discharge of air by the first cooling hole and the second cooling hole according to an embodiment of the disclosure.
Figure 14:
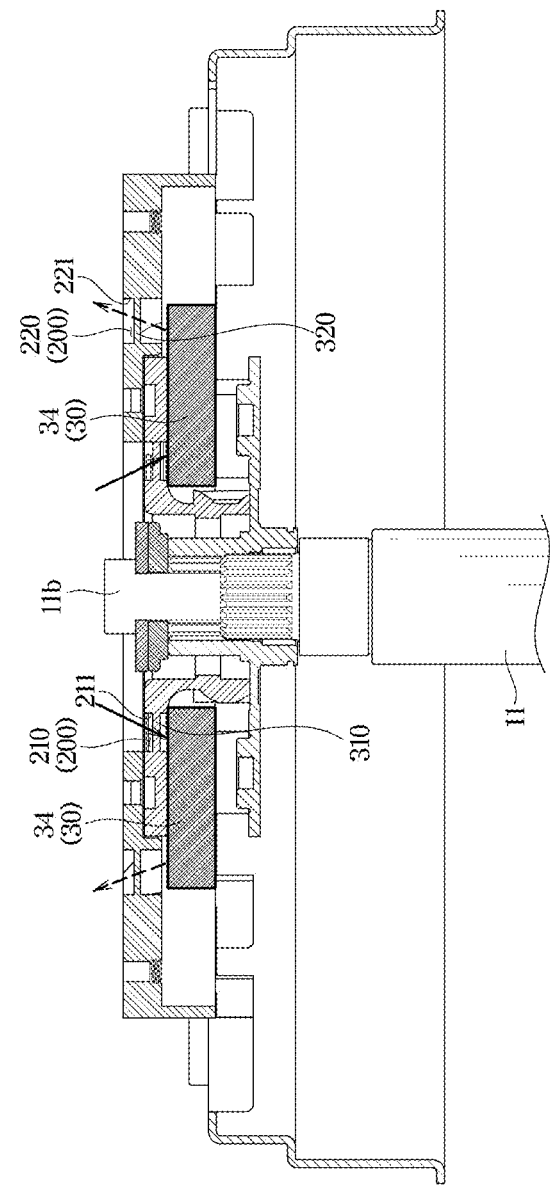
FIG. 14 is a view illustrating an airflow state by the first cooling hole and the second cooling hole according to an embodiment of the disclosure.

FIG. 13 is a view illustrating introduction and discharge of air by the first cooling hole and the second cooling hole according to an embodiment of the disclosure, and FIG. 14 is a view illustrating an airflow state by the first cooling hole and the second cooling hole according to an embodiment of the disclosure.

Referring to FIGS. 13 and 14, in response to the operation of the drive device 10, the drum shaft 11 and the sun gear 31 connected to the drum shaft 11 are rotated.

In response to the rotation of the sun gear 31, outside air is introduced through the first cooling hole 210 provided in the sun gear 31. For example, the outside air is introduced into the first cooling hole 210 in a flow direction M. The outside air may be moved toward the planetary gear 34 through the first cooling hole 210 of the sun gear 31 to cool the heat generated from the planetary gear 34. Particularly, the first cooling hole 210 formed in the sun gear 31 may be arranged at a position corresponding to the planetary gear 34 meshing with the sun gear 31. Outside air may be introduced into the planetary gear 34 side through the first cooling hole 210. The outside air introduced through the first cooling hole 210 may cool the heat generated from the planetary gear 34, thereby improving a cooling efficiency.

In addition, air that cools the heat of the planetary gear 34 or air that absorbs heat generated by the motor 20 may be discharged to the outside through the second cooling hole 220 provided in the rotor case 22.

The second cooling hole 220 formed in the rotor case 22 may be arranged at a position corresponding to the planetary gear assembly 30, and thus air that cools the planetary gear assembly 30 may be discharged through the second cooling hole 220.

An air-cooling heat dissipation structure does not require lubricating oil to prevent temperature rise of the planetary gear 34 and a sealing structure to prevent leakage of lubricating oil. Accordingly, the air-cooling heat dissipation structure excludes the sealing structure, and thus it is possible to reduce the size of the motor. The conventional sealing structure has a thickness of approximately 8 to 10 mm, and thus by removing the sealing structure, it is possible to reduce a thickness of approximately 8 to 10 mm. Therefore, it is possible to increase the efficiency of the motor while reducing the size of the motor.

As is apparent from the above description, it is possible to increase a cooling performance by replacing an oil-cooling heat dissipation structure, in which lubricating oil is used and a shielding gearbox is required to prevent oil leakage, with an air-cooling heat dissipation structure.

Further, it is possible to increase an efficiency of a motor and to reduce a size of the motor, and thus it is possible to implement the motor with a high efficiency and a slim design.

Further, it is possible to reduce a size of a drive device and to reduce a vibration noise.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A washing machine comprising:
   a main body;
   a tub inside the main body;
   a drum configured to be rotated inside the tub; and
   a drive device configured to rotationally drive the drum, the drive device comprising:
      a drum shaft connected to the drum;
      a motor comprising:
         a stator; and
         a rotor configured to be rotated by an interaction with the stator;
      a sun gear connected to the rotor;
      a carrier connected to the drum shaft;
      a planetary gear configured to transmit a rotational force of the sun gear to the carrier; and a cooling flow path formed in the drive device to cool the planetary gear, the cooling flow path comprising:
   a first cooling hole formed in the sun gear to allow outside air which is air outside of the drive device to be introduced into the cooling flow path to cool the planetary gear; and
   a second cooling hole formed in the rotor to allow inside air which is air inside of the cooling flow path to be discharged out of the drive device.

2. The washing machine of claim 1, wherein
a first vane is formed in the first cooling hole so that the outside air is introduced into the cooling flow path in response to a rotation of the sun gear.

3. The washing machine of claim 2, wherein
the first vane has a form of a radial rib.

4. The washing machine of claim 3, wherein
the radial rib of the first vane is arranged at an angle.

5. The washing machine of claim 2, wherein
a second vane is formed in the second cooling hole to allow the inside air to be discharged from the cooling flow path in response to a rotation of the rotor.

6. The washing machine of claim 5, wherein a portion of the second vane is directed in a rotation direction of the rotor.

7. The washing machine of claim 6, wherein
a portion of the first vane and the portion of the second vane are directed in opposite directions to each other.

8. The washing machine of claim 7, wherein
the first vane and the second vane are in a form of a radial rib.

9. The washing machine of claim 8, wherein
the portion of the first vane is inclined in a direction away from the drum shaft at a first angle with respect to an inner side of the first cooling hole and the portion of the second vane is inclined a direction toward the drum shaft at a second angle with respect to an outer side of the second cooling hole.

10. The washing machine of claim 2, wherein a portion of the first vane is directed in a direction opposite to a rotation direction of the sun gear.

11. The washing machine of claim 1, wherein a plurality of first vanes is formed in the first cooling hole to allow the outside air to be introduced into the cooling flow path in response to a rotation of the sun gear, and each of the plurality of first vanes is arranged to be spaced apart from an adjacent one of the plurality of first vanes in a circumferential direction of the first cooling hole.

12. The washing machine of claim 11, wherein a plurality of second vanes is formed in the second cooling hole to allow the inside air to be discharged from the cooling flow path in response to a rotation of the rotor.

13. The washing machine of claim 2, wherein
a second vane is formed in the second cooling hole to allow the inside air to be discharged from the cooling flow path in response to a rotation of a rotor.

14. The washing machine of claim 1, wherein
the first cooling hole is located closer to the drum shaft than the second cooling hole.

15. The washing machine of claim 1, wherein
the air introduced through the first cooling hole is moved toward the planetary gear.

16. The washing machine of claim 1, wherein
the rotor comprises:
   a bottom wall formed in a circular shape; and
   a peripheral wall formed around the bottom wall, and
wherein the bottom wall comprises the second cooling hole formed therein.

17. The washing machine of claim 16, wherein
the sun gear comprises:
   a sun gear body coupled to the bottom wall of a rotor case; and
   a gear member extending from the sun gear body to face the peripheral wall, the gear member comprising a gear formed on an outer peripheral surface thereof, and
wherein the sun gear body has the first cooling hole formed therein.

18. The washing machine of claim 16, wherein
the rotor further comprises:
   a plurality of heat dissipation holes formed in a radial direction around an outer periphery of the bottom wall; and
   a heat dissipation blade to guide air to the heat dissipation hole, and
wherein the second cooling hole is located closer to the drum shaft than the heat dissipation hole.

* * * * *